April 21, 1936. W. A. MORTON 2,038,190
FEEDER
Filed June 24, 1929
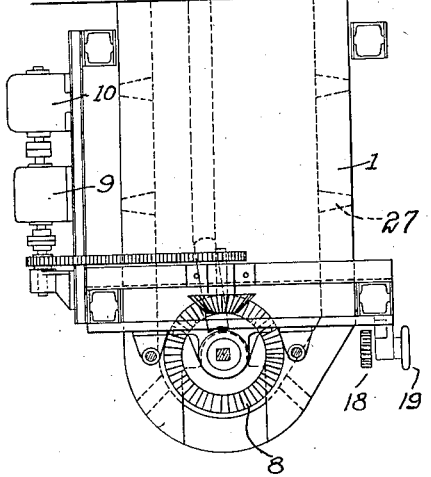
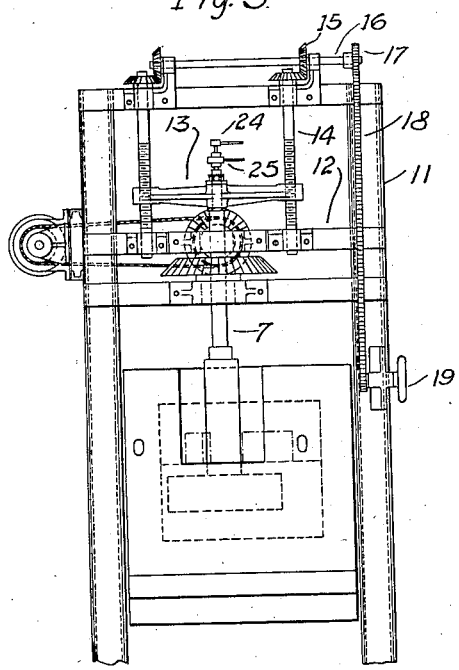
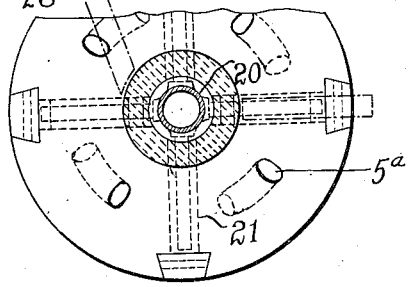
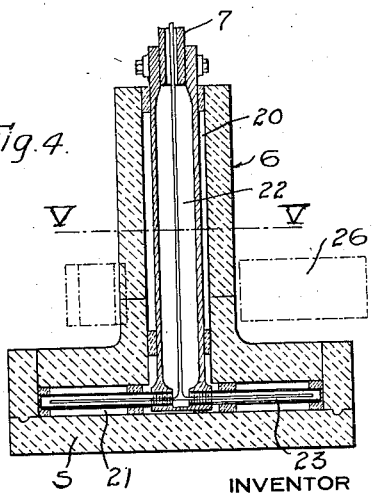
INVENTOR
William A. Morton
by William B. Jaspert
Attorney Patented Apr. 21, 1936

2,038,190

UNITED STATES PATENT OFFICE 2,038,190

FEEDER

William A. Morton, Pittsburgh, Pa.

Application June 24, 1929, Serial No. 373,122

12 Claims. (Cl. 49—56)

One of the principal objects of this invention is to provide means for delivering glass of uniform temperature to a glass working device. This is accomplished by the mixing effect of an impeller which imparts lateral and vertical motion to glass simultaneously and prevents the glass resting in contact with its support means for a period of time which would cause a change in temperature and viscosity. In most glass working devices glass charges of non-uniform viscosity are delivered to the working machine, impairing quantity production of articles of desired commercial quality.

This invention relates to forehearth structures for glass melting tanks and more particularly to apparatus for delivering molten glass to suction forming machines of the type in which glass is drawn from the forehearth into the mold of the forming machine.

Glass forming machines which draw their charge from the glass tank, operate to project the molds into the pool of glass which is drawn into the mold when the latter is evacuated. When the mold is filled, the attenuated body connecting the glass in the pool and mold, is cut off by suitable shears and drops back into the pool. The shearing of the attenuated body leaves a chilled and roughened surface in the pool which would greatly increase to the extent of preventing the manufacture of good glassware, and to obviate this difficulty, it has been suggested to constitute within the pool, from which the glass is drawn, a rotating member which circulates the glass in said pool.

In accordance with the present invention, the forehearth of the tank is not bodily rotated, as was heretofore customary, but the pool from which the glass is drawn is provided with a fresh undisturbed glass surface of generally uniform temperature by means of a rotating disk which is submerged in the pool and which is adapted to provide circulation of the molten glass in the forehearth which is merely an extended portion of the glass melting hearth.

In the accompanying drawing constituting a part hereof and in which like reference characters designate like parts, Fig. 1 is a top plan view of a forehearth and disk embodying the principles of this invention; Fig. 2 is a longitudinal sectional view thereof, partly in elevation; Fig. 3 is a front elevational view; Fig. 4 is a vertical sectional view of the disk member employed in the forehearth; and Fig. 5 is a sectional elevational view thereof taken along the line V—V, Fig. 4.

Referring to Fig. 2 of the drawing, the structure therein illustrated comprises a forehearth 1 provided with an opening 2 through which the molten pool of glass 3 is made accessible to the molds of a suction forming machine. The forehearth 1 projects from the glass tank or furnace, generally designated at 4. A disk member 5 having an extension sleeve 6 is disposed through the opening 2 of the forehearth and is adapted to be submerged in the pool 3. The sleeve 6 of the disk is secured to a hollow vertical spindle 7 which is connected by gearing 8 and speed reducer 9 to a drive motor 10. The drive mechanism is suitably supported on a frame structure generally designated at 11 to suspend it above the forehearth.

As shown in Figs. 1 and 3, the disk 5 and its drive spindle 7 are carried by a cross member 12 that is fixed to the frame 11 and the spindle 7 is journalled in a yoke member 13 having screw thread engagement with screw spindles 14 that are adapted to be rotated through mitre gears 15 and the shaft 16. The latter is connected through sprocket gear and chain 17 and 18 with a hand wheel 19 by the rotation of which the cross yoke 13 and its spindle 7 are subjected to vertical movement for the purpose of changing the position of disk 5 with respect to the surface of the pool in which it is submerged.

The disk 5 is subjected to very high temperatures and is therefore constructed of suitable heat resisting materials, and in addition is provided with a water cooling system to protect it from the intense heat.

The detail construction of the disk is more clearly illustrated in Figs. 4 and 5 of the drawing in which the disk 5 is shown as a refractory body of hollow construction in which a conduit or pipe 20 is disposed. A spider consisting of pipes 21 is secured to the end of the pipe 20 and a pipe line 22 having branches 23 projecting into the pipes 21 is disposed in the conduit 20 and constitutes a water supply source by means of which a cooling medium is circulated through the disk, the water being withdrawn through the pipe 20 and the hollow spindle 7.

As shown in Fig. 3, the spindle 7 is provided with a swivel joint and overflow projection 24 and 25 through which the cooling medium is conducted to and from the disk 5.

A skimmer 26 illustrated in the dotted line construction in Figs. 4 and 5 is provided to prevent the glass chills created by the mold contact being returned too quickly by the rotating disk 5 which may result from rapid rotation of the latter, whereby the surface of the glass is constantly renewed at the withdrawal position. The skimmer or scraper may also be made of refractory or other suitable heat resisting materials.

As shown in Figs. 2 and 5, the disk 5 may be provided with openings 5a extending from the lower to the upper face of the disk. The openings are at an angle the inclination of which is such that molten glass will feed upwardly from the bottom to the top of the working pool for the direction of rotation in which the disk is normally operated, to provide an adequate supply of fresh glass.

As a further means for preventing the chilled glass from accumulating in the working pool, the forehearth is divided by a partition wall 26a and by rotation of disk 5 circulation of the molten glass is produced on both sides of the partition member. With this construction the chilled glass is passed to the rear of the forehearth where it mingles with the hot glass from the furnace, and burner ports 27 are provided to maintain the glass pool at suitable working temperature.

The scraper 26 is fitted into the top of the partition wall 26a as shown in Fig. 5 and is adjustable by screw members 26b with respect to the upper face of the disk 5.

In operation, the circular clay brick or disk 5 is submerged slightly below the surface of the glass in the forehearth 1 of the melting tank. The glass is very viscous at bottle working temperature and the disk is rotated at suitable speeds through the transmission and drive motor to move a fresh undisturbed glass surface of generally uniform temperature to the region of the opening 2 in which the suction molds contact with the pool 3 to withdraw successive charges of workable molten glass. The disk may be raised or lowered in the pool to change the depth of glass above the upper surface of the disk in accordance with the quantity of glass withdrawn by a given mold charge.

It is evident from the foregoing description of the invention that a submerged rotatable disk embodied in the forehearth of a furnace is capable of maintaining a supply of fresh uniform temperature glass for suction forming machines, whereby a product of uniform quality is produced.

The disk as shown is operated in a clockwise direction and is offset in the mouth of the forehearth in such manner as to readily draw heated glass into the area occupied by the said disk.

Although one embodiment of the invention has been herein illustrated and described it will be obvious to those skilled in the art that various modifications may be made in the details of construction without departing from the principles herein set forth.

I claim herein as my invention:—

1. In a glass working chamber for supplying molten glass to a glass forming machine of the suction type, the combination with mechanically movable means disposed below the surface of the pool for moving the glass therein, of a skimmer engaging the surface of the glass moved by said movable means whereby the surface of the glass is mechanically leveled.

2. In a glass working chamber having a pool supplying molten glass to a glass forming machine having a constant withdrawal position relative to the chamber, of means submerged within the glass pool and below the surface thereof for moving the glass past the withdrawal position and a skimmer engaging the surface of the glass above the glass moving means whereby the surface may be constantly renewed at the withdrawal position.

3. In a glass working chamber having a pool for supplying molten glass to a glass forming machine obtaining a glass charge from the surface of glass in the pool, the combination of means for moving the glass below said surface and means for engaging said surface from above.

4. In a glass working chamber having a pool for supplying molten glass to a forming machine, a rotatable member submerged below the surface of the pool, and means for actuating said member for circulating the glass horizontally in the glass gathering area said member being further provided with means for working the glass from the bottom to the top of the pool in response to its rotating movement.

5. In a glass working chamber having a pool for supplying molten glass to a forming machine, of a partition wall dividing said chamber and extending to said pool, a rotary member submerged in said pool and means adapted to divert the flow of glass produced by the rotary member to one side of said partition wall.

6. The method of effecting circulation of molten glass which comprises imparting movement thereto by a member angularly movable in a horizontal path located internally in the glass, directing the flow of glass past a gathering station, and circulating the glass vertically while subjecting it to horizontal movement.

7. The method of effecting circulation in a pool of molten glass which comprises imparting movement to the glass by an impeller below the surface of the glass, and arresting recirculation of the surface glass remote from the gathering area to continually renew the glass surface in the gathering area.

8. The method of effecting circulation of molten glass which comprises moving the glass from a heated supply source to a gathering area and returning the unused surface portion thereof through separately defined paths, circulating the glass in the gathering area by an impeller disposed below the glass surface, and arresting the direct recirculation of the surface portion to continually renew said surface in the gathering area.

9. In a glass working chamber having a pool for supplying molten glass to a forming machine, a glass gathering area defined by the walls of said chamber, a rotatable member submerged below the surface of the pool for circulating the glass horizontally in the glass gathering area, said member having a plurality of inclined slots in angularly spaced relation extending from the bottom to the top thereof, said slots functioning to displace the molten glass from directly below the rotatable member to the top thereof.

10. Apparatus for supplying and circulating molten glass which comprises a glass melting tank having an extension thereon, said extension being adapted to contain a pool of molten glass, an opening for establishing communication between the interior of the glass melting tank and the said extension, a refractory block located in said opening for dividing it into a plurality of glass conducting channels, means for causing glass to flow from the glass melting tank through one of said channels into the said extension, and from said extension back into the melting tank, comprising a stirring implement having a disk-shaped head immersed in the glass, means for rotating said implement about a vertical axis and an extension formed on said block overlying said disk for removing glass therefrom.

11. In combination with an extension of a glass melting tank for containing a pool of molten glass, a rotary circulator constantly dipping in the glass, means for rotating said circulator about a fixed vertical axis, and a refractory member in said pool of glass, positioned radially of said circulator, said member partially dividing the pool into separate channels and having a part thereof shaped to serve as a scraper for removing glass from the circulator.

12. Apparatus for supplying and circulating molten glass which comprises a glass melting tank having an extension thereon, said extension being adapted to contain a pool of molten glass, an opening for establishing communication between the interior of the glass melting tank and the said extension, a refractory block located in said opening for dividing it into a plurality of glass conducting channels, means for causing glass to flow from the glass melting tank through one of said channels into the said extension, and from said extension back into the melting tank, comprising a stirring implement having a disk-shaped head immersed in the glass, means for rotating said implement about a vertical axis and an extension formed on said block overlying said disk for removing glass therefrom, said disk-shaped head and extension being vertically adjustable.

WILLIAM A. MORTON.